Jan. 12, 1943. P. J. McCULLOUGH 2,308,091
ELECTRIC COOKER
Filed Oct. 5, 1938 2 Sheets-Sheet 1
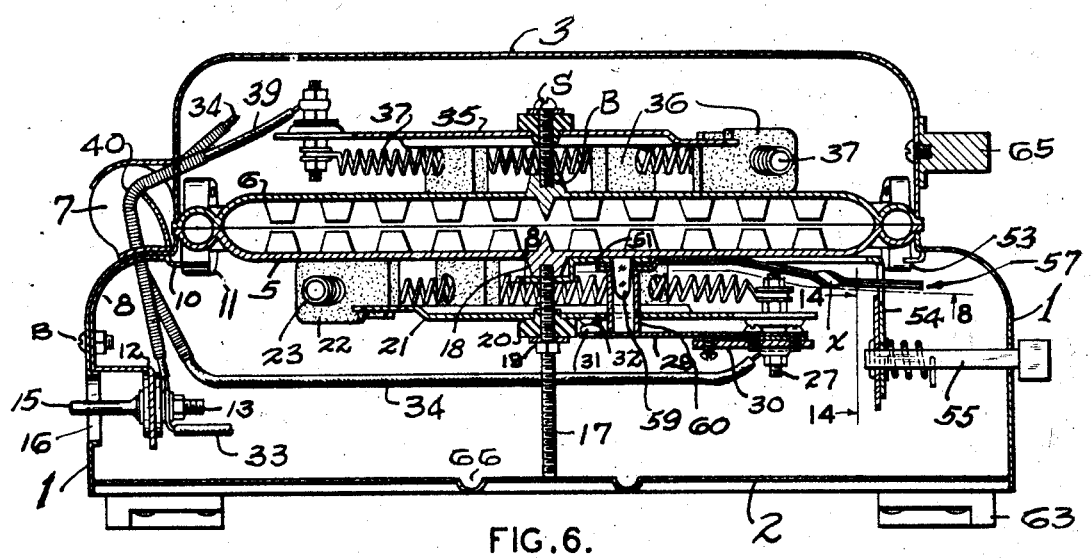
FIG. 6.
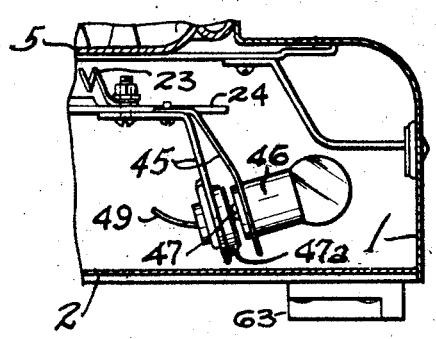
FIG. 7.
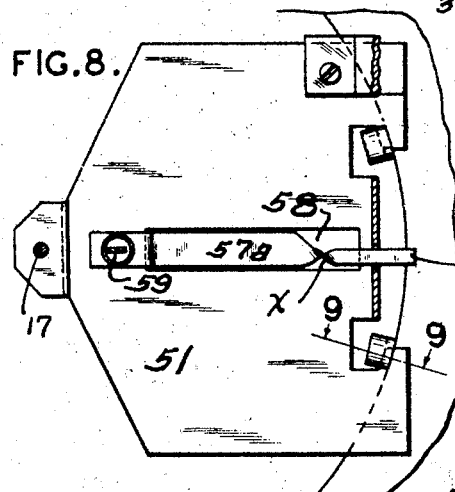
FIG. 8.
FIG. 9.
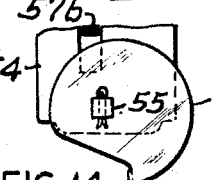
FIG. 14.
FIG. 10.
FIG. 11.
FIG. 12.
FIG. 13.
INVENTOR
PAUL J McCULLOUGH
BY Rodney Bedell
ATTORNEY Jan. 12, 1943. P. J. McCULLOUGH 2,308,091
ELECTRIC COOKER
Filed Oct. 5, 1938   2 Sheets-Sheet 2
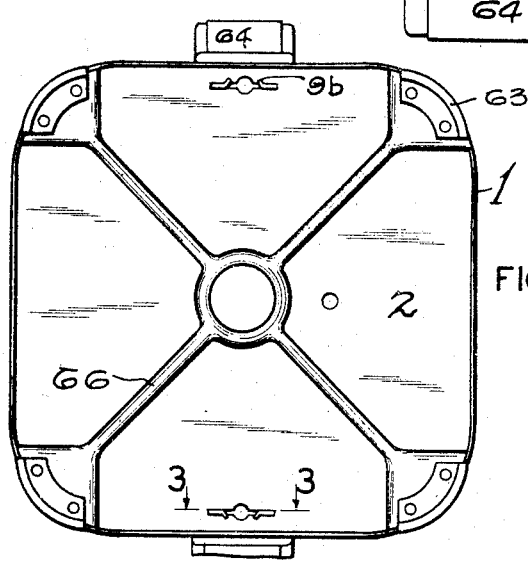
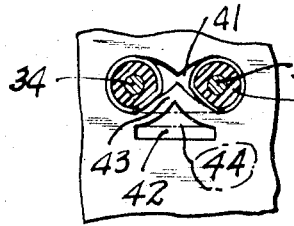
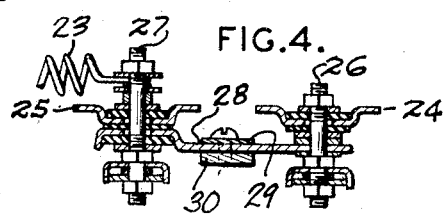
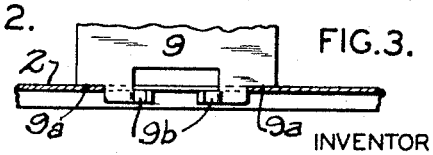
INVENTOR
PAUL J. McCULLOUGH
BY Rodney Bedell
ATTORNEY Patented Jan. 12, 1943

2,308,091

UNITED STATES PATENT OFFICE 2,308,091

ELECTRIC COOKER

Paul J. McCullough, St. Louis, Mo., assignor to Joseph Pavelka, St. Louis, Mo.

Application October 5, 1938, Serial No. 233,363

5 Claims. (Cl. 219—19)

This invention relates to cooking devices and more particularly to electrically operated cooking devices, although some features of the invention may be embodied in devices utilizing heating means other than electric current.

One object of the invention is to control automatically the cooking period whereby successive products will be cooked uniformly and to this end I disclose a novel thermostat device capable of application substantially to different apparatus.

Another object of the invention is to simplify the mounting of a heating element and its assembly with the cooking surface or compartment.

Another object of the invention is to simplify the assembly of a bottom cover plate to a casing wall whereby the application and removal of the plate may be facilitated.

Another object of the invention is to provide a support for the center of a relatively thin plate-like cooking member, which will not interfere with the heating of the same but which will effectively support the plate to prevent sagging of the plate.

Another object of the invention is to simplify the attaching of the electric conduit to the casing of a heating device in a manner which will effectively hold the conduit in place but readily accommodate releasing of the same for intentional removal.

These and other detailed objects of the invention as will appear from the following description are attained by the structure illustrated in the accompanying drawings, in which—

Figure 1 is a bottom view of an electric waffle iron embodying the invention, the bottom cover plate being removed.

Figure 2 is a similar view on a smaller scale showing the cover plate in position.

Figure 3 is a detailed vertical section taken on the line 3—3 of Figure 2, illustrating the means for securing the cover plate in place.

Figure 4 is a detailed vertical section taken on the line 4—4 of Figure 1.

Figure 5 is a detailed elevation of a portion of the casing showing the manner of securing the electric conduit in place without affecting its flexibility.

Figure 6 is a vertical section through the device and is taken approximately on the line 6—6 of Figure 1.

Figure 7 is a detailed vertical section taken on the line 7—7 of Figure 1.

Figure 8 is a view looking upwardly at the thermostatic member and adjacent parts and is taken approximately on the line 8—8 of Figure 6.

Figure 9 is a detailed vertical section taken on the line 9—9 of Figure 8.

Figures 10, 11, 12, and 13 are enlarged views of the thermostatic member, as illustrated in Figure 6, shown in different operating positions with adjacent cooperating elements of the device being sectioned.

Figure 14 is a detailed view taken on the line 14—14 of Figure 6.

The waffle iron includes a lower casing or housing comprising a body member 1 and a detachable bottom cover 2, and an upper casing or housing comprising an inverted cup-like body 3. An angular member 9, secured to the side wall of body casing 1 is offset inwardly and downwardly and provided with shoulders 9a (Figure 3), for seating cover 2, and with undercut lugs 9b projecting through slots in cover 2 and twisted to hold cover 2 in place.

Cooking grids 5 and 6 are mounted on casings 1 and 3, respectively. Upper casing 3 is hinged at 7 to lower casing 1, whereby grids 5 and 6 are separated, or juxtaposed as shown in Figure 6, in the usual manner.

A plate bracket 8 is detachably secured by bolts B to the rear or hinged portion of casing 1. The upper end of plate 8 terminates in a flange 10 seated in slotted lugs 11, depending from grid 5 and holds the rear portion of the grid in assembled relation with casing 1. The lower portion of plate 8 is flanged inwardly and downwardly at 12 to mount a pair of terminals 13 and 14, insulated from the plate and having outwardly projecting prongs 15 extending through a recess 16 in the casing and providing for the application of the usual electric cord plug.

A threaded rod 17 has its upper end inserted in a central boss 18 on grid 5 and has its lower end engaging the bottom cover 2. A nut and washer 19 on rod 17 support an insulator bushing 20, which carries a metal disc 21, mounting a series of insulator blocks 22, which carry the coiled wire heating element 23.

Fingers 24 and 25 extend forwardly from disc 21 and mount, through insulated attaching means, posts 26 and 27, respectively. One end of heating element 23 is attached to post 27 and the other end of the heating element is attached to disc 21. A bridge 28 is supported by posts 26 and 27, being in contact with post 26 and insulated from post 27. Bridge 28 mounts a switch blade 29 of spring material and a switch blade adjusting device 30, whereby the tension of the spring switch blade may be controlled. A contact button 31 on the inner end of blade 29 opposes a contact button 22 on the lower face of disc 21. An electric wire 33 leads from terminal 13 to post 26. An electric wire 34 leads from post 27 through plate 8 and casing 1 to the exterior of casing 1, then through an opening in casing 3 to the interior of the latter where it is connected to a post (not shown) mounted on a disc 35, corresponding to disc 21 and supporting insulator blocks 36, carrying a coiled wire heating element 37 adjacent to upper grid 6. A screw S, through disc 35 and a central boss B on grid 6, clamps blocks 36 in place, securely maintaining the upper heating assembly. One end of element 37 is secured to the post at the end of wire 34 and the other end of element 37 is secured to a corresponding post, carried by the disc 35. A wire 39 extends from post 38 through casing 3 to the exterior of casing 3 and then through an opening in casing 1 and plate 8 and is secured to terminal 14.

The portions of wires 34 and 39 passing through casings 1 and 3 are encased in coiled wire sheathing 40. To provide for quickly securing encased wires 34 and 30 to casing 3 in a position where they may flex readily, without being drawn back and forth through the casing, I utilize a double slot arrangement illustrated in Figure 5, the upper slot 41 being shaped to readily receive the encased sheathing 40 and the lower slot 42 being adapted to receive a screw driver or like tool, whereby the narrower strip of metal 43 between slots 41 and 42 may be distorted, from the dot and dash line position indicated at 44, to the full line position indicated in Figure 5 in which sheathing portions 40 are securely gripped although, if necessary, a tool may be inserted in slot 41 to force strip 43 downwardly to release the grip on sheathing 40.

From the above description it will be seen that the circuit for the electric heaters extends through the following elements in the order indicated. Terminal 13, wire 33, post 26, bridge 28, switch blade 29, contacts 31 and 32, disc 21, heater 23, post 27, wire 34, post (not shown) on disc 35, heater 37, post 38, wire 39, and terminal 14.

A bifurcated bracket 45 is carried by disc 21 (Figure 7) and one leg of the bracket is apertured to receive and contact with the base 46 of a low voltage electric lamp, the central contact button 47 of which is pressed against a cup 47a insulated from the other leg of the bracket and connected by a wire 49 to heating element 23 at a point on the latter near its end, attached to disc 21, thereby providing a simple shunt circuit for the lamp, without requiring an individual shunt coil therefor. The lamp is a signal visible from the outside of the casing through a colored lens 50 to indicate to the user that the current is turned on, and that the grid is being heated. When the heater circuit is opened automatically, as explained below, the lamp goes out and the user is signaled that the iron is no longer being heated although its retained heat may still function to further cook the waffle.

A plate 51 has a flanged inner end overlying grid boss 18 and having its outer end portions 52 engaging the under side of casing 1 and received in slotted lugs 53 depending from grid 5 and corresponding to lugs 11 at the rear of the grid (Figure 9). Plate 51, rod 17, and plate 8 cooperate to hold the grid in assembled relation with the casing, rod 17 functioning particularly to avoid sagging of the grid at its center when heated. The intermediate outer portion of plate 51 is flanged downwardly at 54 to cooperate with the adjacent portion of casing 1 to journal a shaft 55, carrying a cam 56 on its inner end (Figure 14), the function of which will be explained presently.

The cooking period is determined by the temperature of the lower grid through a thermostatic control for the switch blade 29. The thermostat device includes a strip 57 comprising layers of metals having substantially different coefficients of expansion. The main body portion 57a of the strip is adapted to lie in a slot 58 in plate 51 to contact with grid 5. The inner end of the body of the thermostat loosely fits around a tongue 59, depending from grid 5. An insulating sleeve 60 is carried by switch blade 29 and supports the inner end of thermostat 57. The outer portion 57b of the thermostat is substantially narrower than the body portion 57a and extends through an opening provided therefor in flange 54 and overlies the upper edge of cam 56.

The bimetal strip is twisted at X about its longitudinal axis approximately 180 degrees so the heat-induced distortion of the inner and outer portions of the thermostat will be in oppositely facing arcs.

One of the problems attending thermostatic control of cooking devices as illustrated is to secure uniformity of cooking operations. If the waffle iron were heated to cooking temperature before the first waffle was cooked, or if the waffle iron were always cooled to atmospheric temperature before each successive waffle were cooked, it would be comparatively simple to provide a thermostat which would function the same for each operation. Obviously it will take longer to heat a cold waffle iron and cook a waffle thereon than it will to cook a waffle on an iron which already had been heated. A thermostatic device adjusted to be distorted to the extent necessary to open the switch at the end of a proper period for the first operation would retain sufficient latent heat and would receive sufficient heat from the warm waffle iron and from the warm air enclosed in the heater casing so that its distortion on the second operation would be accelerated and the switch would be opened before the waffle would be cooked.

To overcome this condition, the present invention embodies a self-compensating thermostat provided by the twisting of a bimetal strip intermediate its ends and preferably reducing the area of one end portion. A certain amount of heat will distort the reduced end of the device in the opposite direction to the distortion of the body of the device and, accordingly, the latter will then have to distort to a greater degree to effect opening of the switch. This operation is apparent from inspection of Figures 10 to 13 in which Figure 10 illustrates the thermostat device and associated parts when the apparatus is cold and in which condition the switch buttons 31 and 32 will be in contact and the circuit closed. As the body of the thermostat is heated its distortion will bring its outer end 57b down, until it strikes the upper edge of cam 56 which serves as a fulcrum, whereby further distortion is accompanied by downward movement of the inner end of the thermostat, which presses against sleeve 60 and separates the switch buttons (Figure 11). As the heat from grid 5 warms the entire thermostat and the chamber, the relatively short end portion 57b bows upwardly, as indicated in Figure 12, and even though the body 57a is distorted, as shown in Figure 11, the circuit may be closed by the upward movement of switch blade 29.

As the thermostat is subjected to a greater temperature and longer heating period, the body portion 57a will distort further, as indicated in Figure 13, to again move switch blade 29 downwardly, notwithstanding the upwardly curving of outer portion 57b. The distortion of body portion 57a thrusts the same tightly against the bottom of grid 5, insuring a high degree of conduction of heat from the plate to the thermostat.

From then on the temperature of outer portion 57b will remain substantially constant, but the major body portion 57a of the thermostat will begin to cool upon the opening of the circuit and the application of cool batter to the grid and will permit the switch to close at about the end of the period required for removing the cooked waffle and the application of the batter for another waffle.

Cam 56 provides a simple manual adjustment for varying the action of the thermostat. Obviously rotation of shaft 55 by the button 61 on its outer end raises or lowers the effective fulcrum about which the thermostat pivots when its inner end moves downwardly to separate the switch contacts. A coil spring 62 provides sufficient frictional contact between cam 56 and its support 54 to maintain the cam in adjusted position unless intentionally shifted.

The device includes a handle 64 whereby it may be moved from place to place and the top part 3 has a handle 65 whereby it may be swung about its hinge. The device is elevated above the table, or other surface upon which it is placed, by feet 63 and bottom cover 2 is corrugated as at 66 to render it more rigid and to afford better support, through rod 17, for the central portion of the grid.

It will be understood that the grid may be supported intermediate its periphery by a bar extending between the side walls of the lower casing, or by other forms of braces, but the rod 17 with its nut for adjustably mounting the heater supporting plate provides a convenient manner of supporting the grid and other elements also.

It is not essential to the control of the heater switch that the thermostatic strip be twisted a full 180 degrees intermediate its ends, or that the superimposed layers of metal be continuous from end to end. The compensating feature of the strip may be attained to different degrees by a lesser twist of the strip. Also the thermostatic member may be formed by two or more lengths of strip material with the relation of the metals to the normal plane of the member being reversed in the two strips.

These and other details of the structure are relatively unimportant. It will be understood that some of the described and illustrated matter may be used irrespective of the presence of the other features and some of the features may be used in apparatus other than waffle irons. The exclusive use of such modifications of the invention as come within the scope of the claim is contemplated.

What is claimed is:

1. In a cooker, a cooking member to be heated, a heat supply structure therefor including a control device, a thermostat actuated by the temperature of said member to operate said device, a casing forming a chamber receiving said thermostat and heated by said member, said thermostat comprising a bimetal strip, the metals being of different coefficient of expansion, a positive support for one part of said strip, another part of said strip being in thermal relation to said member and a third part of said strip being connected to said device, said strip being twisted about its longitudinal axis approximately 180 degrees between the first two mentioned parts, whereby the distortion of the entire strip in opposite directions, due to the heat in said chamber, compensates for said chamber heat and adapts the thermostat to effect uniform action of the device irrespective of variations in the initial heat of said chamber.

2. In a device of the class described, a member having a cooking surface, a disc-like plate of conducting material adjacent said member, a plurality of insulators mounted on the periphery of said plate, and electric resistance heating element carried on said insulators and connected at one end to said plate, a casing enclosing said plate, insulators and element, means insulated from said plate and supporting the same in said casing and thrusting the same towards said member to clamp said insulators between said plate and said member to support said plate insulated from said member, and inlet and outlet conduits, one of which is connected to said plate and the other of which is connected to said heating element.

3. In a device of the class described, a plate-like member to be heated, a metal plate adjacent to said member but insulated therefrom, an electric resistance heating element with one end secured to said plate and with its remainder insulated from said plate, an electric current supply circuit having one wire connected to the other end of said element and the other wire connected to said plate, a metal bracket on said plate including a socket for receiving and contacting a lamp base, and a cooperative lamp contacting part having a connection to said heating element at a point near the latter's connection to said plate to form a relatively low voltage shunt circuit for a lamp in said socket.

4. In a waffle iron, a casing forming a peripheral wall, a bottom plate secured to said wall, a grid spaced above said plate with its rim mounted on said wall, a rod extending between the central portion of said grid and said plate to prevent said grid from sagging, a support adjustably mounted on said rod, and a heating element and a switch therefor carried on said support.

5. In an electric cooker, a cooking plate, a heating element, an electric circuit for energizing said element, a switch in said circuit, an elongated bimetal thermostat for controlling said switch and functioning in accordance with the heat of the thermostat and having spaced portions the movement of which is limited respectively by a movable part of said switch, by a stationary part of said plate and by a stationary fulcrum part, said thermostat being twisted approximately 180° between said fulcrum part and the adjacent part, said thermostat being located at different distances from said heating element whereby the distortion of said thermostat during a cooking operation closely following an operation beginning when the cooker was cold will compensate for the below-cooking temperature of the thermostat and adjacent parts retained from the previous operation.

PAUL J. McCULLOUGH.